United States Patent [19]

Ahlborn et al.

[11] 4,260,927
[45] Apr. 7, 1981

[54] STANDING BOW SHOCK ELECTRICAL POWER GENERATOR

[75] Inventors: Boye Ahlborn; Joe W. M. Kwan, both of Vancouver, Canada

[73] Assignee: Canadian Patents and Development Limited, Ottawa, Canada

[21] Appl. No.: 84,588

[22] Filed: Oct. 15, 1979

Related U.S. Application Data

[63] Continuation-in-part of Ser. No. 877,494, Feb. 13, 1978.

[51] Int. Cl.³ .............................................. H02N 4/02
[52] U.S. Cl. ...................................... 310/300; 310/11
[58] Field of Search ................ 310/300, 308, 309, 10, 310/11

[56] References Cited

U.S. PATENT DOCUMENTS

| | | | |
|---|---|---|---|
| 3,317,763 | 5/1967 | Brumfield | 310/11 |
| 3,337,759 | 8/1967 | Damay | 310/11 |
| 3,368,088 | 2/1968 | Krzycki et al. | 310/11 |
| 3,372,290 | 3/1968 | Sowa et al. | 310/308 |
| 3,622,817 | 11/1971 | Isaacson | 310/11 |
| 4,134,034 | 1/1979 | Dardai et al. | 310/11 |

Primary Examiner—Donovan F. Duggan
Attorney, Agent, or Firm—Edward Rymek

[57] ABSTRACT

Apparatus for generating electric power directly from a supersonic gas flow. An obstacle is positioned in the supersonic gas flow to establish a standing shock wave having a potential gradient. A pair of electrodes, one located in the upstream direction from the shock wave and the other located in the downstream direction from the shock wave, are used to extract power from the potential gradient.

12 Claims, 10 Drawing Figures

STANDING BOW SHOCK ELECTRICAL POWER GENERATOR

BACKGROUND OF THE INVENTION

This application is a continuation-in-part of U.S. application Ser. No. 877,494, filed on Feb. 13, 1978, the invention is directed to electrical power generation, and in particular to direct electrical power generation from a supersonic gas flow.

Various forms of electrical power generation have been investigated wherein the structural parts of the apparatus do not have mechanical motion. The main forms presently known are the fuel cell, magnetohydrodynamic generator, thermoelectric generator, thermionic generator and the solar cell.

Another such generator is described in U.S. Pat. No. 3,372,290 which issued to Sowa et al on Mar. 5, 1968. It consists of an apparatus which generates a high velocity vapor jet. The vapor, whether steam or alcohol, is ionized as it passes through a standing shock wave. The charge resulting from the ionization of the vapor is separated by placing a first conducting screen immediately downstream from the shock wave region to collect electrons and by placing a second conductor further downstream to collect the positive charge. The apparatus is described to provide a potential difference across the conductors in the order of 30,000 volts, though the power levels attained are not mentioned.

SUMMARY OF THE INVENTION

It is therefore an object of this invention to provide apparatus for generating electrical power directly from a supersonic flow.

This and other objects are achieved in an apparatus wherein a standing shock wave is established in a supersonic gas flow such that a potential gradient is formed across the shock wave. Power is extracted from the potential gradient by a first electrode positioned upstream from the shock wave and a second electrode positioned downstream from the shock wave such that neither of the electrodes electrically cut across the shock wave.

In accordance with one aspect of the invention, the standing shock wave is established by mounting a wedgeshaped obstacle in the supersonic flow. The obstacle can alternately be shaped as a converging nozzle in the direction of gas flow, whereby a standing shock wave is formed as the gas flow is forced to converge.

In accordance with another aspect of the invention, a number of obstacles may be positioned in the gas flow. These obstacles may be in a plane normal to the gas flow or distributed in the direction of flow.

Many other objects and aspects of the invention will be clear from the detailed description of the drawings.

DESCRIPTION OF THE PREFERRED EMBODIMENTS

The generalized Ohms law for plasmas links the current J with electromotive forces (e.m.f.)

$$J = \text{const} E + \text{const } u \times B + \text{const } J \times B + \text{const grad } p_e$$

Electrical currents may be driven by electric fields—E, by the Lorentz force—$u \times B$, by the Hall effect —$J \times B$, or by gradients of the electron pressure—$p_e$. The basis of the present invention is to generate an electrical current by an electron, or more generally by a charge carrier, pressure gradient, which is constantly produced and maintained by a standing shock wave. The standing shock wave generator produces a temperature difference which is maintained by the standing shock wave in a supersonic gas flow. This temperature difference causes the charged carrier pressure gradient, thus converting some of the kinetic energy of the gas flow into electrical power.

Figure 1A:
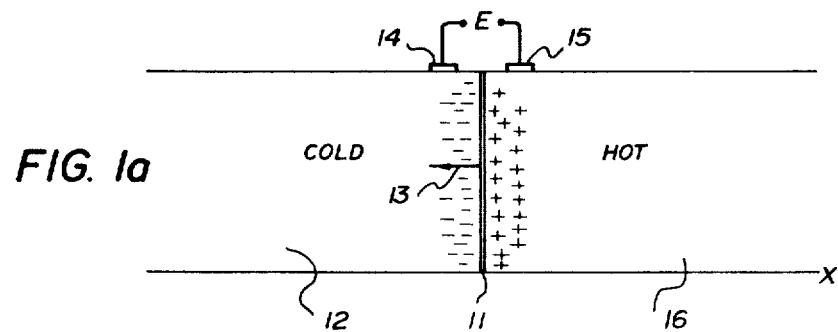
FIGS. 1a, 1b and 1c illustrate the principle of the invention.
Figure 1B:
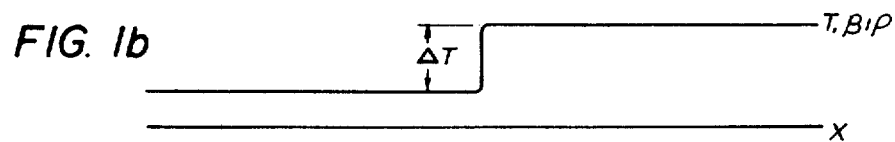
Figure 1C:
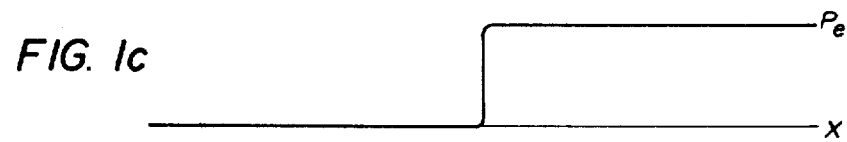

FIGS. 1a, 1b and 1c illustrate the principle of the invention by considering a plane, normal shock wave front 1 running through a stationary gas 2 and leaving behind a hot gas 6. The shock wave moves through the gas from right to left as indicated by arrow 3. The cold gas on the left is thus impacted by the shock wave front at a supersonic velocity. The gas is compressed by the shock front nearly instantaneously, increasing its pressure p, temperature T, and density $\rho$ as illustrated in FIG. 1b.

The temperature change $\Delta T$ is approximately proportional to the square of the shock front velocity. The gas may be dissociated or ionized by the shock if the shock velocity is high enough, and therefore, ions and electrons are found in the hot regime behind a very strong shock. The electron pressure distribution $p_e$ as a function of x will have a strong gradient in the vicinity of the shock front as illustrated in FIG. 1c. In a plane and normal shock wave this gradient $p_e$ drives a diffusion current of electrons into the non shock heated cold gas indicated in FIG. 1a by "—" signs on the left hand side. Within a very short time this space charge separation generates an electric field E which is of the order of 1 volt if the electron temperature difference between the hot and cold side is about kT=1 eV. The space charge field prevents further electron diffusion. It is possible to detect the potential E by electrodes 4 and 5 and would be possible to extract a current continuously if the electrodes could be fixed with respect to the shock front without shorting out the potential gradient. This is accomplished by producing a standing shock wave in a supersonic gas flow.

Figure 2:
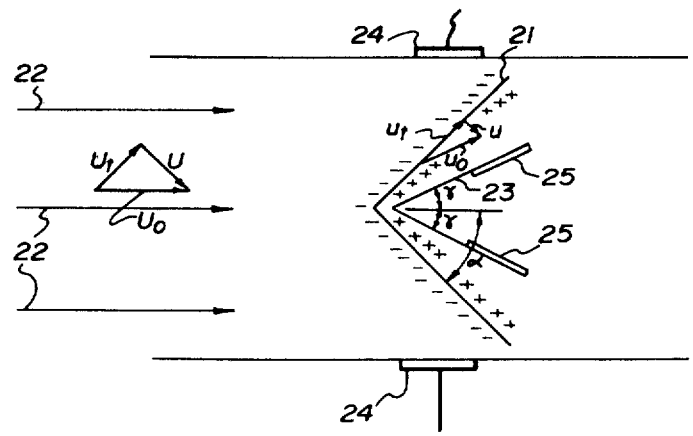
FIG. 2 illustrates the basic apparatus of the invention.

In the simplest case, the standing shock wave 21 is created by impinging a supersonic gas flow illustrated by arrows 22 upon an obstacle 23 as illustrated in FIG. 2. The Mach number of the gas flow would typically be 2-3. The obstacle 23 is shown as a wedge shaped or conical object having an angle of attack $\gamma$ which is preferrably greater than 10°. Obstacle 23 forces the flow into a new direction, deflecting the individual particles in the flow by the angle $\gamma$. The standing shock 21 created, is at an angle $\alpha$ to the forward axis. Dividing the velocity of the supersonic flow before $U_o$ and after $u_o$ passing through the shock front 21 into components parallel and perpendicular to the shock wave 21, it is determined that the parallel components $U_t$ and $u_t$ of the velocities are not affected by the shock 21, i.e. $U_t=u_t$. The normal component U is the effective intake velocity and is responsible for the shock compression. The compression ratio, i.e. the ratio of densities upstream and downstream of the shock, is equal to U:u. With a strong standing shock 21, the incoming gas is ionized as in the running shock in FIG. 1, and the diffusion of the hot electrons driven by the gradient $p_e$ creates an electric field.

In order to extract power from the standing shock wave 21, one or more electrodes 24 are located upstream from the shock wave 23 and one or more electrodes 25 are located downstream from the shock wave 21. Thus, neither of the electrodes electrically cut across the shock wave which would short out the potential gradient. The downstream electrode 25 may be mounted on the obstacle 23 itself or the obstacle 23 may be entirely conductive.

Figure 3:
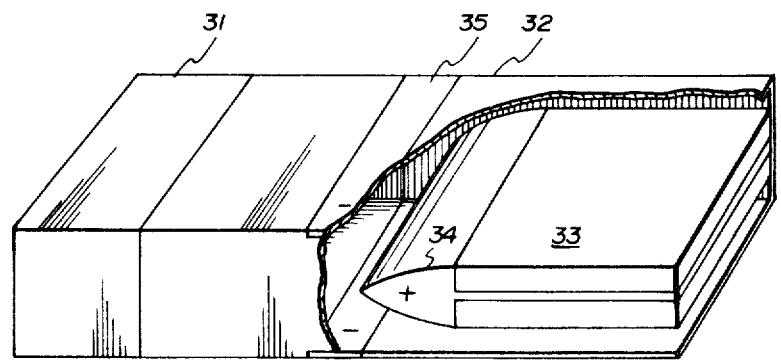
FIG. 3 illustrates one embodiment of a single shock wave generator.
Figure 4:
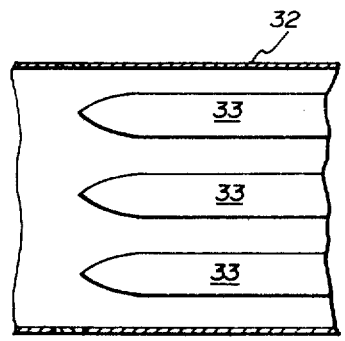
FIG. 4 illustrates a generator having three parallel shock waves.

The standing shock generator illustrated in FIG. 3 includes a source 31 which provides the supersonic gas flow to a chamber 32 and one or more obstacles 33 mounted within the chamber 32. If the chamber 32 is large a number of obstacles 33 may be mounted in parallel to one another in a spaced relationship as shown in FIG. 4. The obstacle 33 is appropriately shaped to produce a standing shock wave upstream from the obstacles. When the obstacle 33 is also used as one of the electrodes, the front edge 34 of the obstacle is constructed of conductive material. When more than one conductive obstacle 33 is located in the chamber, they may be electrically connected in parallel. The generator also includes one or more electrodes 35 embedded into the walls of the chamber 32. Electrodes 35 are positioned upstream from the shock wave and in such a manner so as not to impede the supersonic flow of gas, and not to interact the shock front 21 thereby creating a short circuit.

Figure 5:
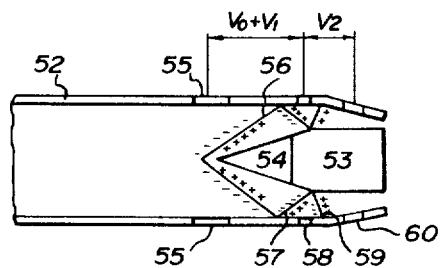
FIG. 5 illustrates a generator having three shock waves in series.

In a generator having an appropriately shaped chamber 52, and obstacle 53, a series of standing shock waves may be created as shown in FIG. 5. The first shock wave 56 is established upstream from obstacle 53 and produces a potential $V_o$ across electrodes 54 and 55. A second shock wave 57 is established between the obstacle 53 and the chamber 52 wall as the supersonic flow strikes the wall, producing a potential $V_1$ across electrodes 54 and 58. With the chamber 52 walls shaped inward towards the obstacle 53, or if the obstacle 53 were shaped outward toward the wall 52, a third shock wave 59 is established, producing a potential $V_2$ across electrodes 58 and 60. However, care must be taken that the shock wave does not come into direct contact with an electrode, otherwise the e.m.f. across the shock wave will be short circuited. If the flow is sufficiently constricted between wall 52, and obstacle 53, the flow can become subsonic. Flow through the constriction can be re-expanded by a Laval nozzle to become supersonic again. This would permit the use of a further generator stage in which an additional obstacle creates a new shock wave for energy extraction.

Figure 6:
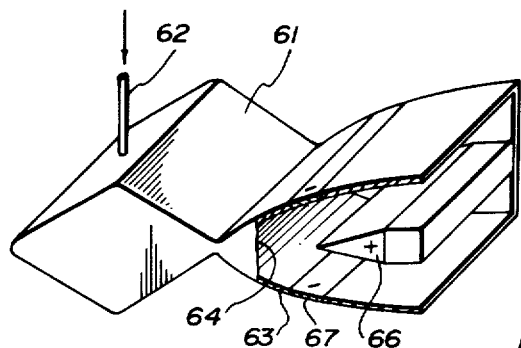
FIG. 6 illustrates a second embodiment of a one shock wave generator, where the supersonic flow is produced by expanding the products of a chemical reaction through a Laval nozzle.

The generator illustrated in FIG. 6 includes a source of supersonic gas flow consisting of a combustion chamber 61. Fuels, such as acetylene $C_2H_2$ and oxygen $O_2$ enters the combustion chamber 61 via tube 62 and are detonated. The combustion products are exhausted through a slit 64 (or hole) into the generator chamber 63 which has the shape of a Laval nozzle. The nozzle generates the supersonic flow. As in the previous embodiments, the supersonic flow establishes a standing shock upstream from an obstacle 65 and a potential is produced across electrodes 66 and 67. Voltages of the order of 0.2 volts have been obtained. Since the temperature of the chemical reaction is too low to produce electrons in significant numbers, it is concluded that a bow shock generator also operates with heavy positive and negative ions or charged molecules as primary current carriers.

Figure 7:
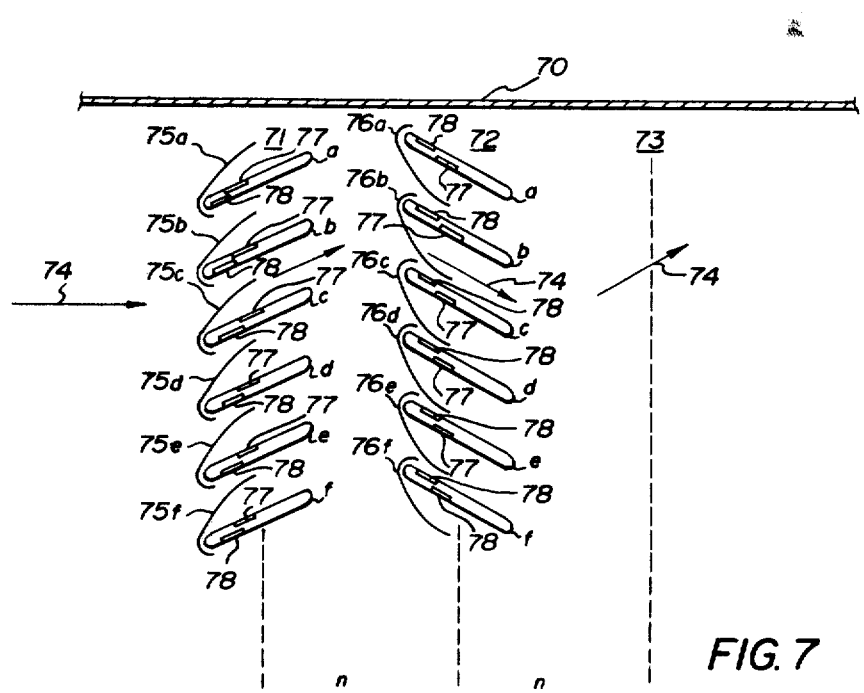
FIG. 7 illustrates a generator having multiple parallel and series shock waves.

The standing shock generator is in principle a low voltage generator, with the current extracted being proportional to the area of the shock front created. Thus a number of generators may be positioned in series or a number of obstacles may be located in parallel as in FIG. 4. However, for a large volume flow field, the generator illustrated in FIG. 7 is preferred. The generator includes a number of sets 71, 72, 73, ... of parallel electrically nonconducting fins a, b, c, d, e, f, ... n, mounted within a chamber schematically illustrated by wall 70. The direction of supersonic gas flow through the chamber is indicated by arrows 74. The fins a, b, c, ... in each set 71, 72, ... are positioned obliquely to the direction of gas flow to establish a standing shock at each fin a, b, c, ... n. The standing shocks 75a, 75b, 75c, ... for the first set 71 of fins extend upward from the fins due to their positioning, whereas the standing shocks 76a, 76b, 76c, ... for the second set 72 of fins extend downward. The positioning of any further sets of fins is alternated in the same manner.

To extract energy from across the standing shock waves, a first electrode 77 is mount in one face of each fin a, b, c, ... n, and a second electrode 78 is mounted in the other face of the fin. These pairs of electrodes for each set of fins 71, 72, ... may be connected in parallel, by connecting the first electrodes 77a, 77b, 77c, ... together and the second electrodes 78a, 78b, 78c, ... together, to provide an output potential $V_o$ equal to the potential across the shock wave and an output current equal to the sum of the individual currents. Alternately, the electrodes may be connected in series to provide an output voltage $nV_o$. In this latter case, the electrode 77 would be connected to electrode 78 in each fin a, b, c, . . . n. In the latter case, the construction of the fin may be simplified by making the entire upstream end of the fin out of conductive material forming a single electrode.

Figure 8:
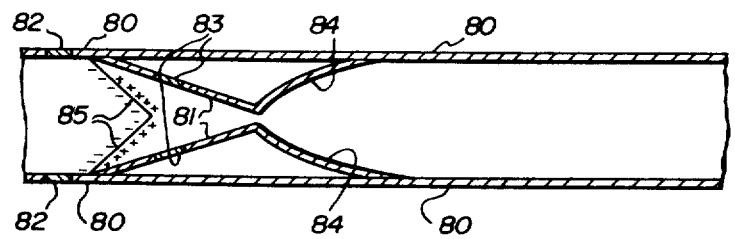
FIG. 8 illustrates an embodiment with converging cones and expansion nozzles to create standing shocks in successive stages.

An alternate form of shock generator is illustrated in FIG. 8. The generator includes chamber walls 80 having an obstacle 81 located within the walls 80, the obstacle 81 being in the form of a converging nozzle such that the supersonic gas flow within walls 80 will establish a shock wave 85 in the nozzle shaped section 81. To extract energy from across the shock wave 85, electrodes 82 are located in walls 80 and electrodes 83 are located in the obstacle 81 walls. As the flow moves through the obstacle section 81, it becomes subsonic. By making the walls of the back section 84 of the obstacle 81 diverge in the form of a Laval nozzle, the flow becomes supersonic again, and shock wave generation may be repeated.

We claim:

1. Apparatus for generating electrical power from a supersonic gas flow comprising:
   means for establishing a standing shock wave having a potential gradient in the supersonic gas flow; and
   first and second electrode means for extracting power from across said potential gradient, said first electrode means being positioned in the undisturbed flow upstream from said standing shock wave and said second electrode means being positioned in the shocked flow downstream from said standing shock wave, such that neither of the electrode means electrically cut across the standing shock wave.

2. Apparatus as claimed in claim 1 wherein the standing shock wave establishing means includes an obstacle positioned in the gas flow.

3. Apparatus as claimed in claim 2 wherein the obstacle has a wedge-shaped surface facing the supersonic gas flow.

4. Apparatus as claimed in claim 2 wherein the obstacle has a conical shaped surface facing the supersonic gas flow.

5. Apparatus as claimed in claim 2 wherein the obstacle consists of a converging nozzle in the direction of gas flow.

6. Apparatus as claimed in claim 2 wherein the obstacle consists of one or more flat fins mounted at an angle to the supersonic gas flow.

7. Apparatus as claimed in claim 2 wherein the obstacle is electrically nonconductive and the second electrode means is mounted on the nonconductive obstacle.

8. Apparatus as claimed in claim 7 wherein the apparatus includes an elongated chamber for directing the gas flow.

9. Apparatus as claimed in claim 8 wherein the first electrode means is mounted in the walls of the elongated chamber.

10. Apparatus for generating electrical power from a supersonic gas flow comprising:
    an elongated chamber for directing the gas flow;
    one or more obstacle means mounted within the chamber, each of the obstacle means establishing a standing shock wave having a potential gradient; and
    electrode means for each standing shock wave for extracting power from across its potential gradient, said electrode means having at least a pair of electrodes positioned on opposite sides of the standing shock wave such that the electrodes do not electrically cut across a standing shock wave.

11. Apparatus as claimed in claim 10 wherein the electrode means includes one or more first electrodes positioned in the upstream direction from a standing shock wave and one or more second electrodes positioned in the downstream direction from a standing shock wave.

12. Apparatus as claimed in claim 11 which further includes first terminal means to electrically connect the first electrodes and second terminal means to electrically connect the second electrodes.